United States Patent [19]
Kapur

[11] Patent Number: 4,700,320
[45] Date of Patent: Oct. 13, 1987

[54] BITMAPPED GRAPHICS WORKSTATION

[75] Inventor: Rajan N. Kapur, Summit, N.J.

[73] Assignee: American Telephone and Telegraph Company, AT&T Bell Laboratories, Murray Hill, N.J.

[21] Appl. No.: 753,271

[22] Filed: Jul. 9, 1985

[51] Int. Cl.[4] .......... G09G 1/16; G06F 3/153

[52] U.S. Cl. .......... 364/521; 340/723; 340/731; 340/747; 364/518

[58] Field of Search .......... 364/518, 521, 522; 340/720, 723, 724, 729, 730, 731, 734, 747

[56] References Cited

U.S. PATENT DOCUMENTS 4,451,895 5/1984 Sliwkowski .......... 364/521
4,490,797 12/1984 Staggs et al. .......... 364/522

OTHER PUBLICATIONS

Steven Dines et al, "Data Handling for Advanced VDU Facilities," *Electronic Product Design*, (Mar. 1984), pp. 53-58.
Leo J. Guibas et al, "A Language for Bitmap Manipulation," *ACM Transactions on Graphics*, vol. 1, No. 3 (Jul. 1982), pp. 191-214.
Gary C. Staas, "New Display Station Offers Multiple Screen Windows and Dual Data Communications Ports," *Hewlett-Packard Journal* (Mar. 1981), pp. 3-8.
Srinivas Sukumar et al, "Hardware and Firmware Support for Four Virtual Terminals in One Display Station," *Hewlett-Packard Journal* (Mar. 1981) pp. 13-15.
Richard Palm et al, "LSI Building Blocks Enhance Performance of Compact Displays," *Electronic Design* (Jul. 12, 1984), pp. 175-185.

*Primary Examiner*—Felix D. Gruber
*Assistant Examiner*—H. R. Herndon
*Attorney, Agent, or Firm*—Jerry W. Herndon

[57] ABSTRACT

A bitmapped graphics workstation comprising a host computer, window managing circuitry, a display memory, visual display device and multiplexing circuitry connecting the display memory to the display device. The window managing circuitry allows the display memory to be partitioned into plural individually contiguous bitmaps, each corresponding to a different displayed window. The window managing circuitry is divided into a common control section and individual window sections corresponding to each window that may be defined. The host computer writes data describing the parameters of each defined window into the individual window managing circuits. It also stores data to be displayed in the windows (including hidden data) in appropriate addresses of each of the bitmaps. As the display device is refreshed, the common and the window circuits of the manager cooperate to select window "winners", i.e., the foremost window at each pixel of the screen. The appropriate contents of the bitmap corresponding to the winner at any given time is read under control of the winning window circuit sent to the display device via the multiplexing circuitry.

46 Claims, 15 Drawing Figures

FIG. 9 'IN WINDOW' DETECTOR

BITMAPPED GRAPHICS WORKSTATION

TECHNICAL FIELD

The invention relates to bitmapped graphics applications and particularly to bitmapped graphics workstations and terminals arranged with "window" managing circuitry to control window displays, scrolling and window border generation.

BACKGROUND OF THE INVENTION

Bitmapped text and graphics applications have become commonplace at the present time. Such applications which provide for "windowing" are also available. "Windowing" is a technique whereby a visual display screen at a terminal or workstation is partitioned into distinct, independent areas (windows), each containing potentially distinct and independent information. One window may be an active window into which text is being entered, for example, while other windows may be temporarily idle or engaged in other functions, such as outputting to a printer. An operator of such a terminal or workstation usually is able to scroll the information in all windows vertically or horizontally.

Typically, windows may be defined to be located anywhere on a screen, as desired by a user. Thus, several windows can be simultaneously present on the screen with various portions of some or all of the windows overlapping with other windows. I refer to this as independent windowing. A window with a higher "depth" that is overlapping a window with lower "depth" creates a hidden portion of the lower depth window in the overlapped portion.

At the present time, all known workstations that support independent "windowing" use raster scan visual output devices. Raster scanning is the same technique used in commercial television sets to continuously refresh the screen. The screen is repetitively scanned line-by-line by a modulated electronic beam moving from the top to the bottom of the screen. In present art independent "windowing" technology, a contiguous block of display memory (the bitmap) stores the information to be displayed on the screen. As the raster moves across and then down the screen, data is read from consecutive address locations of the display memory and used to modulate the scanning beam.

A difficulty with this arrangement of refreshing the screen is that large amounts of data shifting in the display memory is typically required. There are a number of reasons for this. If an operator is engaged in modifying the contents of an active window, the locations of the display memory corresponding to the window are being changed accordingly, while the remaining portions of the memory remain static. If the active window overlaps other windows, the contents of those windows cannot be displayed on the screen and must be temporarily stored in another hidden memory not associated with the display. If the operator selects another active window, the contents of the display memory must be updated to reflect the new state of the screen to be displayed. This usually involves moving large blocks of data from the hidden memory to the display memory. Vertical and horizontal scrolling of windows add further complexities to the problem of updating the display memory, as the reader will now appreciate.

Attempts at achieving sufficient processing power to satisfactorily provide independent "windowing" without unacceptable delays follow two general patterns. Early bitmapped workstations used special high speed bit sliced processors operating in parallel on the same input data to generate and store the correct data in the display memory. Recently, more powerful general purpose processors have been successfully used for this purpose by providing programs optimized to handle a number of identified special cases involving data block transfers. Such a technique is called BITBLT (bit block logical transfer) and is discussed by Giubas and Stolfi in "A Language for Bitmap Manipulation", *ACM Transactions on Graphics* Vol. 1, pp. 191–214, July 1982. The technique still requires massive amounts of data transfer in the display memory, however. For this reason, the real-time performance of graphics systems still leaves much to be desired. There is a need in the art, therefore, to find ways to more efficiently process graphics display data.

SUMMARY OF THE INVENTION

The invention is a bitmapped graphics workstations including a host processor, a raster scanned graphics display device and means for defining and controlling the display of data in windows independently defined on the screen of the display device. An individual bitmap memory is provided for each definable window. Other memory is provided for storing the screen boundaries of each window. The defining and controlling means continually identify which, if any, window is presently being refreshed on the screen. At any given time, display data is retrieved from one of the bitmaps associated with a window presently being refreshed. The location in the bitmaps from which the display data is obtained is determined by the boundary definitions of the windows and by the position of the raster on the screen.

To accomplish the above, a depth indication, i.e., an indication of how the windows are visually stacked with respect to each other, is stored for each window. Means are provided for using the depth indications in conjunction with raster position data to determine a "winning" window, if any, at each displayable screen entity. This determines the bitmap from which display data is obtained for each displayable entity. Access means are provided to allow the host processor to write display data into the bitmaps.

In the preferred embodiment, windows are defined by stored addresses identifying the horizontal screen positions of the vertical boundaries of the windows and raster line numbers identifying the horizontal boundaries of the windows. The individual bitmaps are contained in a single display memory. Display memory address generating means are provided to generate the address of an appropriate bitmap at any given time and to modify the address according to the window definition of the associated window and the position of the screen raster.

Means are also provided to allow different visual background stipple patterns for the individual windows to be modulated into the display data as a visual aid to a user. To accomplish this, the display data obtained from the bitmaps is passed through a stipple circuit enroute to the display device. The stipple circuit receives a signal from the defining and controlling means indicating which, if any, stipple pattern to use and it modulates the data accordingly.

DETAILED DESCRIPTION

Figure 1:
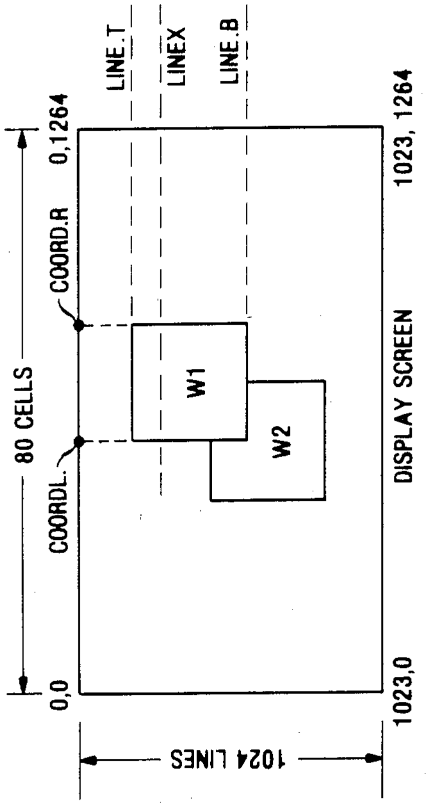
FIG. 1 is an illustration of a display screen with two windows as they might appear in the prior art and with this invention.

FIG. 1 illustrates the face of a display screen as it might appear in an implementation of the present invention. By way of example, the screen comprises 1,024 scan lines in the vertical direction with each line made up of 80 horizontal cells. Without limitation, each cell is the atomic unit of horizontal display in this illustrative embodiment and is composed of 16 horizontal pixels. The upper left corner of the screen is assumed to have an address of line 0 and pixel 0 (or 0.0). Similarly, the upper right corner of the screen is assumed to have a line and pixel address of 0,264 (line 0, pixel 16*79).

and so on. In the embodiment to be described, up to sixteen different work windows may be defined anywhere on the screen by a user. Different and independent work processes may typically be associated with each window. Processes associated with some windows may be idle, for example, while none, one or more processes associated with other windows are active. A user might, for example, activate an output printing process for data associated with one window and then change to another window for interactive editing while the printing is proceeding.

For illustration, the screen in FIG. 1 is assumed to be partitioned into two overlapping work windows W1 and W2. With reference to W1, the projection of its upper-left corner onto the top scan line 0 gives a left cell coordinate COORD.L for W1. Similarly, the projection of the upper-right corner onto line 0 gives a right cell coordinate address COORD.R for W1. Parameters LINE.T and LINE.B define the respective upper and lower line addresses of the window. Equivalent parameters are associated with each defined window.

Figure 2:
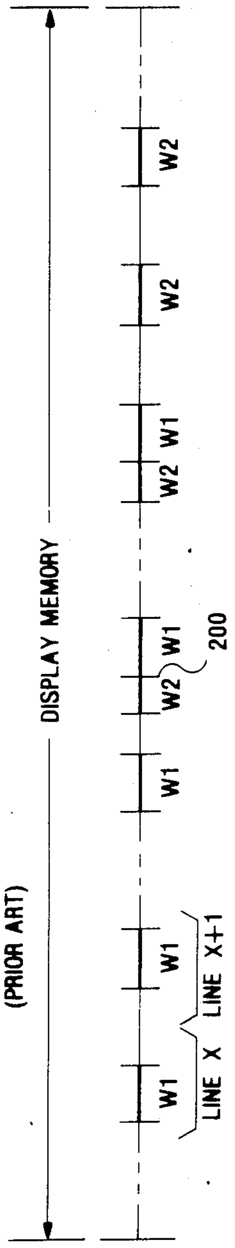
FIG. 2 (PRIOR ART)
FIG. 2 is an illustration of how display data is stored in a single bitmap in the prior art.

FIG. 2 illustrates the manner in which window data is stored for the screen of FIG. 1 by the prior art. Individual bits of a contiguous display memory correspond one-for-one with the sequential pixels of the screen as each line is raster scanned. Thus, one contiguous segment of the memory contains the display data for a line X (shown in FIG. 1) of the screen. Part of the data in this segment corresponds to W1. A next contiguous segment contains data for line X+1, part of which corresponds to W1, and so on. It is easy to see how this leads to complexities, for example, when at 200 of FIG. 2, W1 and W2 begin to overlap. A scrolling of W2, for example, has to take into account the overlapping of the windows and provide for moving "hidden" data in W2 (data that is under W1) into and out of the display memory as scrolling proceeds.

Figure 3:
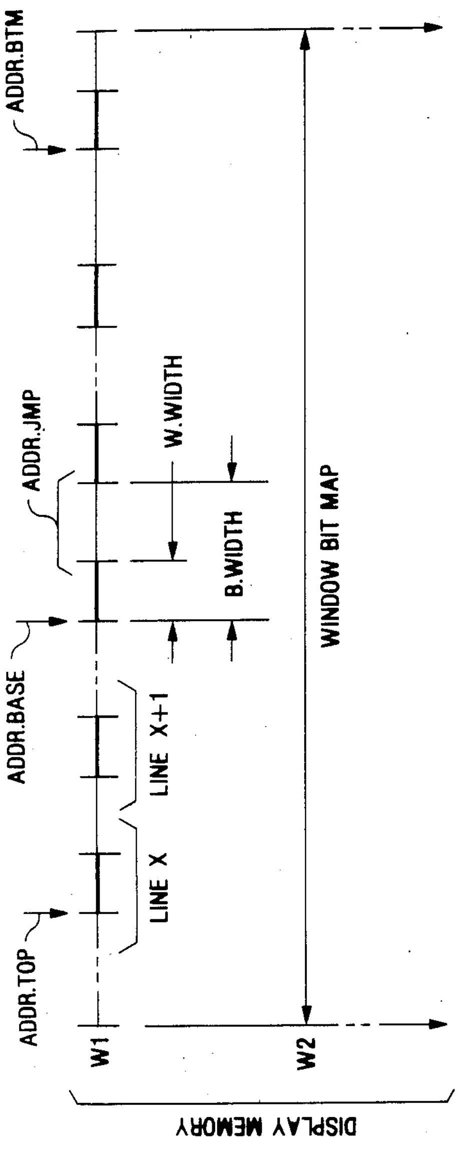
FIG. 3 illustrates how display data is stored in individual window bitmaps in the preferred embodiment of the present invention.

By contrast, FIG. 3 illustrates the manner that display data is handled in this invention. A display memory is partitioned into a plurality of contiguous segments, each of which pertain to a potential window. Henceforth, I will refer to the entire memory as the display memory and the individual contiguous segments for each window as a bitmap. The data in each bitmap is arranged in a fashion similar to that of FIG. 2. With reference to the bitmap corresponding to W1, for example, the data to be displayed in successive lines of the window at a given time are shown in bold in FIG. 2. The arrangement of FIG. 3 reduces many of the problems of data shuffling inherent in the arrangement of FIG. 2. For example, "hidden" data is maintained in the window bitmap memory and need not be relocated as scrolling proceeds. Only that data in a window bitmap that is to be displayed is addressed at the appropriate time, as will be seen. Preferably, each bitmap is larger than that required for the full display screen. This allows any window to be any size up to the size of the screen, or to be located anywhere on the screen and also to be scrolled horizontally and vertically.

Figure 4:
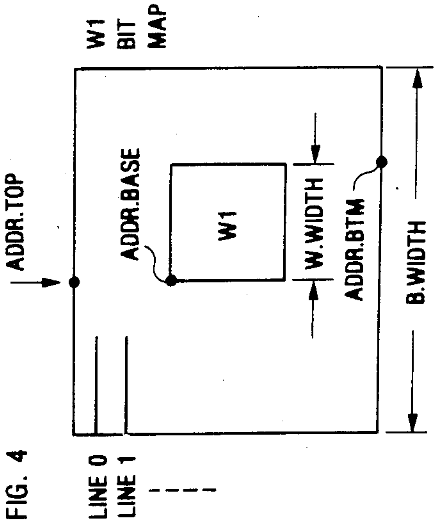
FIG. 4 shows an illustrative individual bitmap in the present invention with the data coresponding to individual raster lines vertically stacked so as to visually resemble a display screen.

The parameters ADDR.TOP, ADDR.JMP, ADDR.BASE, ADDR.BTM, W.WIDTH and B.WIDTH refer to addresses, actually relative addresses, in the individual bitmaps, rather than to screen addresses. FIG. 4 is the bitmap for W1 in which the contiguous sections pertaining to the raster lines of a screen are stacked to give the physical appearance of a screen. This presentation of the bitmap makes it easier to envision the significance of the above parameters. At any given time, ADDR.BASE is the bitmap address at the beginning of the window. ADDR.BTM is the last address before the end of the bitmap containing data to be displayed at any given time. ADDR.TOP is the bitmap address containing the next set of line data for the window after that at ADDR.BTM. W.WIDTH is the width of the window in cells. Each cell corresponds to 16 screen pixels. B.WIDTH is the width of the display screen in cells. ADDR.JMP is the cell distance in the bitmap between the right-most edge of the window and the left-most edge of the window in the next screen line (in other words, ADDR.JMP=B.WIDTH−W.-WIDTH). It should be noted here that windows may or may not contain borders, as desired by a user. If a border is defined for a window, the outside edges of the vertical and horizontal borders correspond to the edges of the window in this illustrative embodiment. In other words, a border is contained within its associated window.

Figure 7:
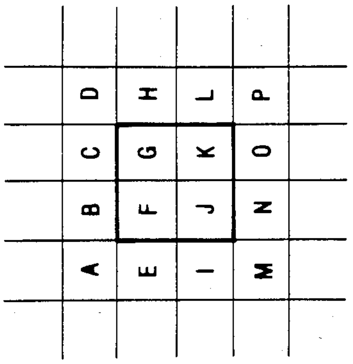
FIG. 7 is a simplified view of a window backlaid with illustrative bitmap data that illustrates the effect of scrolling the window and the corresponding effects on bitmap address generation.

FIG. 7 shows a simplified 2 cell by 2 cell window backlaid with characters to illustrate how scrolling is effected in the invention. The view shows characters F, G, J and K present in the windows. If the window is vertically scrolled down one cell, the host processor 502 modifies the contents of ADDR.BASE by adding to it the number of raster lines assigned to one cell. This causes the window to next display the characters J, K, N and O. If then, the window is scrolled right one cell, ADDR.BASE, ADDR.TOP and ADDR.BTM must be changed. Specifically, the number of pixels in a cell is added to each of these registers. This brings into view the characters K, L, O and P. The modifications to these registers to effect additional scrolling operations should now be evident. It should be noted that no bitmap data transfer is required.

Figure 5:
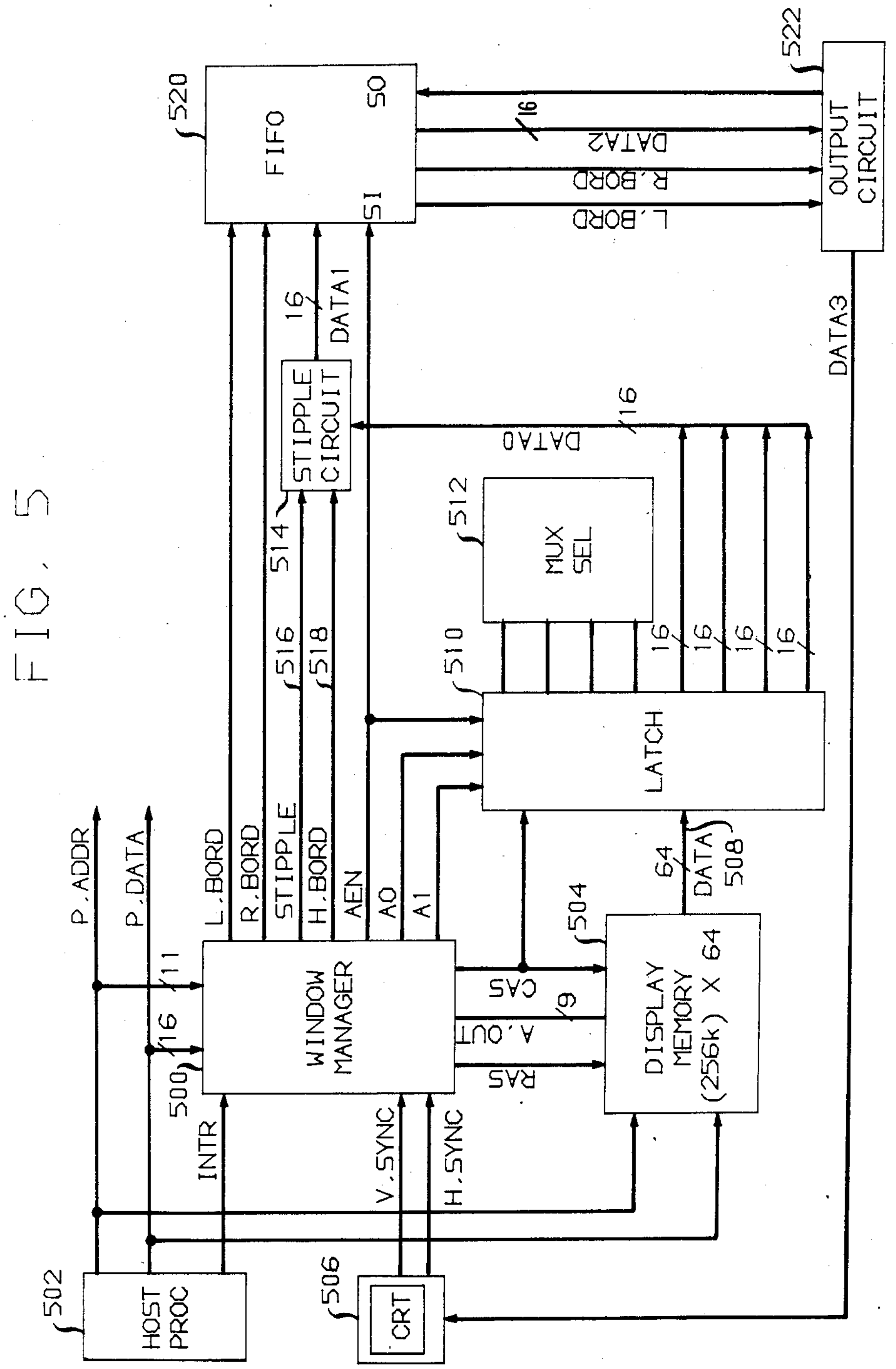
FIG. 5 is an illustrative block diagram of the overall graphics workstation including a window manager circuit.

FIG. 5 shows a block diagram of the overall system. A window manager 500 interconnects a host processor or microprocessor 502, a display memory 504, a display screen 506 and a number of output circuits. Processor 502 writes display data into the display memory 504 via address and data busses P.ADDR and P.DATA. Signals on lead INTR from window manager 500 to processor 502 tell the processor when it is okay to write. In addition, processor 502 writes data into internal registers of window manager 500 to control from where display data is retrieved for each window during raster scanning of display 506. Display memory 504 is illustratively a 256K by 64 bit memory (1K=1024 bits). Data is outputted from memory 504 on bus 508 in 64 bit words. The slash in 508 indicates a multilead bus, and the number beside the slash indicates the number of leads in the bus. This notation is used throughout the disclosure. An input read address bus A.OUT extending from the window manager 500 to display memory 504, however, is only 9 bits wide, whereas 18 address bits are required to address 256K 64-bit words. Therefore, two operations are required to specify the required 18 address bits. A signal on lead RAS (row address signal) signals the first operation and a signal on lead CAS (column address signal) signals the second operation.

A 64-bit word from display memory 504 illustratively comprises data for four 16-bit contiguous cells on the display screen. The entire word is inputted into a latch 510 and the data for the individual cells metered out at appropriate times under control of a multiplexer select circuit 512. Circuit 512 is, in turn, controlled by signals on an address enable lead AEN and two address select leads A0 and A1, which identify the particular 16-bit word to be selected from the 64-bit word.

The cell data from latch 510 is routed into a stipple circuit 514 on bus DATAO. This circuit is controlled by STIPPLE signals on bus 516 and by a horizontal border detection signal H.BORD on lead 518 from the window manager 500 to add desired selective background textures onto the screen to individual windows and to add the horizontal portions of screen borders to the windows, if desired.

The screen data from memory 504, now modulated with stipple and horizontal border data as needed, is inputted into a first-in-first-out buffer 520 from bus DATA 1 under control of signals at its shift-in (SI) input and from there outputted to an output circuit 522 under control of signals at its shift-out (SO) input. Before outputting, however, circuit 522 adds vertical window border signals to the data, as required, in accordance with the state of left and right vertical bonded signals on leads L.BORD and R.BORD. From circuit 522, display data is sent serially to the display device 506 on lead DATA3.

Figure 6:
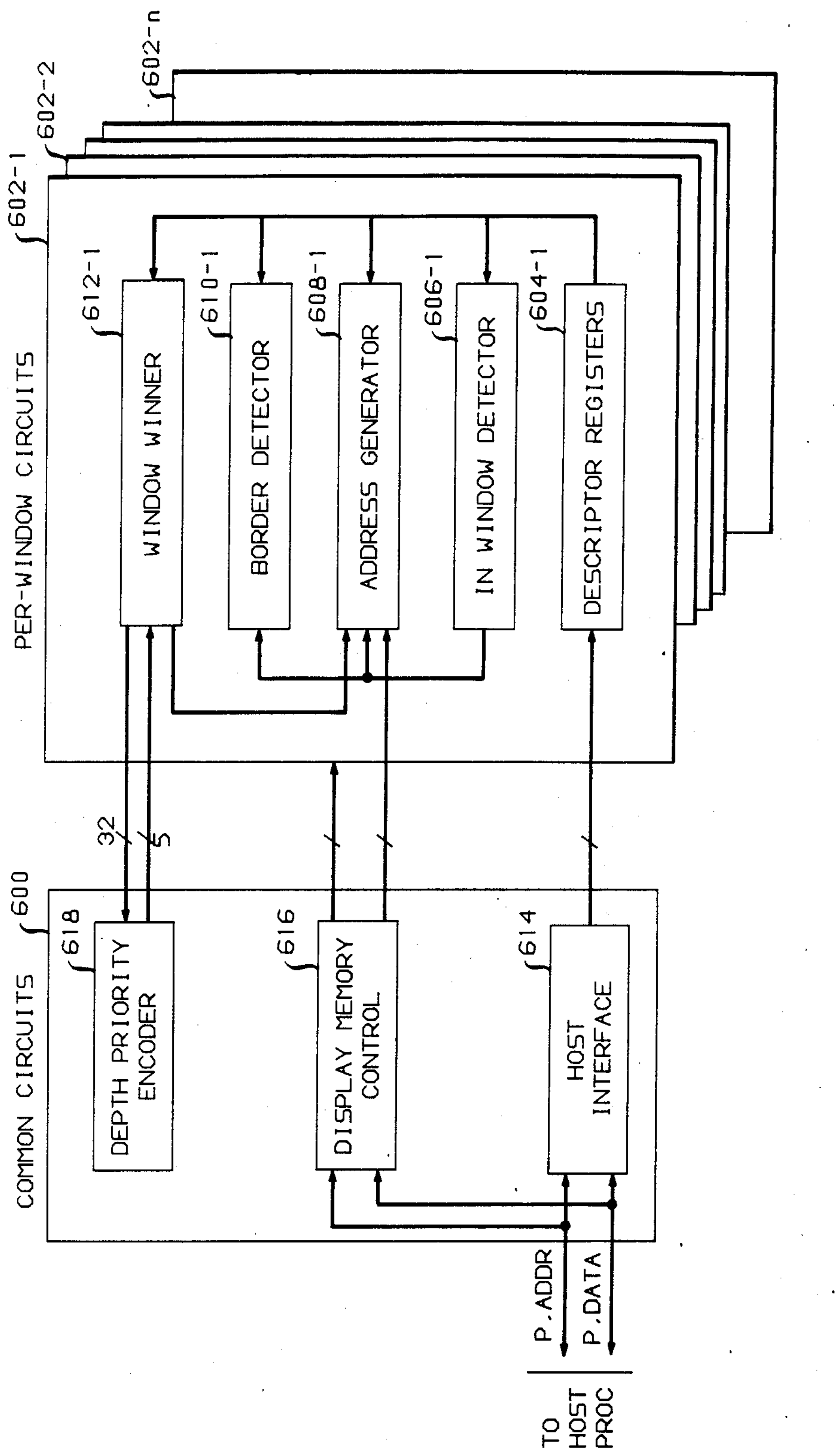
FIG. 6 is an illustrative block diagram of the window manager, including individual per window circuits and common circuits.

A more detailed block diagram of the window manager 500 is shown in FIG. 6. It comprises a common section 600 which interacts with a plurality (up to sixteen in the exemplary embodiment) of per window sections 602-1 through 602-n. A host interface circuit 614 provides the connection to a host processor 502. Each per window section may be associated with an individual window defined at any given time. Since the per window sections are identical, only the details of 602-1 are shown. A descriptor register circuit 604-1 contains a number of registers defining the screen boundaries, border, stipple and depth of the associated window. These registers are loaded by the host processor via a host interface circuit 614 in the common section. An address generator 608-1 in the per window section uses the register data from circuit 604-1 to generate bitmap addresses for fetching screen data for the the associated window. This address data is only used, however, when the respective window is actively being scanned on the screen. To determine which window, if any, is actively being scanned, a depth priority encoder 618 in the common section continuously interacts with window winner circuits such as 612-1 in each of the per window sections to determine a window with the highest depth at the point on the screen presently being scanned. The "in window" circuit 606-1 in each per window section defermines from window definition data and screen position data if the associated window is presently being scanned on the screen. At the same time, the individual window winner circuits obtain respective depth information from the respective descriptor circuits, such as 604-1 and broadcasts this information to the depth priority encoder 618. Circuit 618, in turn, determines the highest depth window at any given time and returns this information to each of the window winner circuits in the per window sections. Outputs from the window winner circuits 612 and the "in window" detectors 606 are examined by the respective address generators 608. If the window area being scanned on the screen is also identified as the present winner, the appropriate address generator 608 is enabled and generates and passes appropriate bitmap addresses to the display memory control circuit 616 for fetching the screen update information.

A border detector 610 in each of the per window circuits detects when border areas of windows are being replaced, if borders are defined, and controls the generation of special signals to create the borders on the screen. Thus, data for creating the window borders is not stored in the bitmaps. The reason for this will become apparent below.

Figure 8:
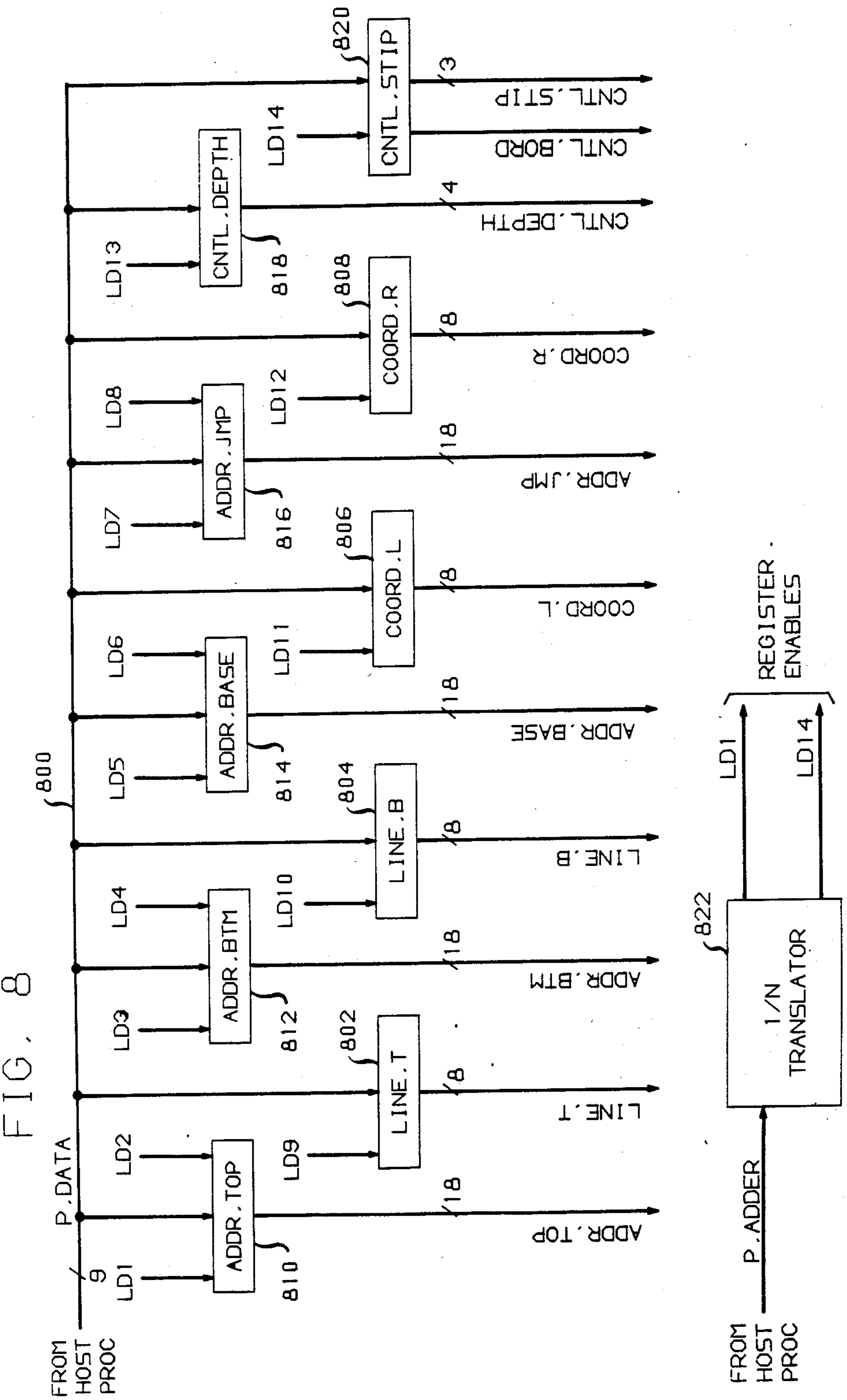
FIG. 8 illustrates a per window circuit that stores data defining the boundaries of a window, bitmap data for generating bitmap addresses and window depth and stipple data.

These individual circuits are now described in detail. A descriptor registers circuit 604 is shown in FIG. 8. When a window is first defined, the defining data arrives on the P.DATA bus 800 from the host processor 502 and is loaded into the registers 802, 804, 806 and 808. These registers are respectively identified as LINE.T, LINE.B, COORD.L, and COORD.R and contain the screen parameters of the window as shown in FIG. 1. When a window is first defined, the host processor also determines the bitmap addresses for the parameters ADDR.TOP, ADDR.BTM, ADDR.BASE and ADDR.JMP, shown in FIGS. 3 and 4, and loads these into the respective registers 810, 812,814 and 816. Two remaining registers CNTL.DEPTH and CNTL.STIP are loaded with numbers that define the depth of a window and a background texture (stipple) for the window as displayed on the screen. These are user preferences and may be changed by a user at any time by entering appropriate commands to the host processor. To load the appropriate data into the correct registers, a register address is transmitted on address bus P.ADDR with each set of register data from the host interface. A 1-out-of-N translator 822 decodes the P.ADDR address into an enable signal LD1 through LD14 which identifies and enables the appropriate register for which the data is intended. Registers 810, 812, 814 and 816 contain the most significant eighteen bits of a twenty bit display memory address. Therefore, two data load operations are necessary for these registers, since bus P.DATA is nine bits wide. Accordingly, two different LD signals from translator 822 are used to load each of these registers.

Figure 9:
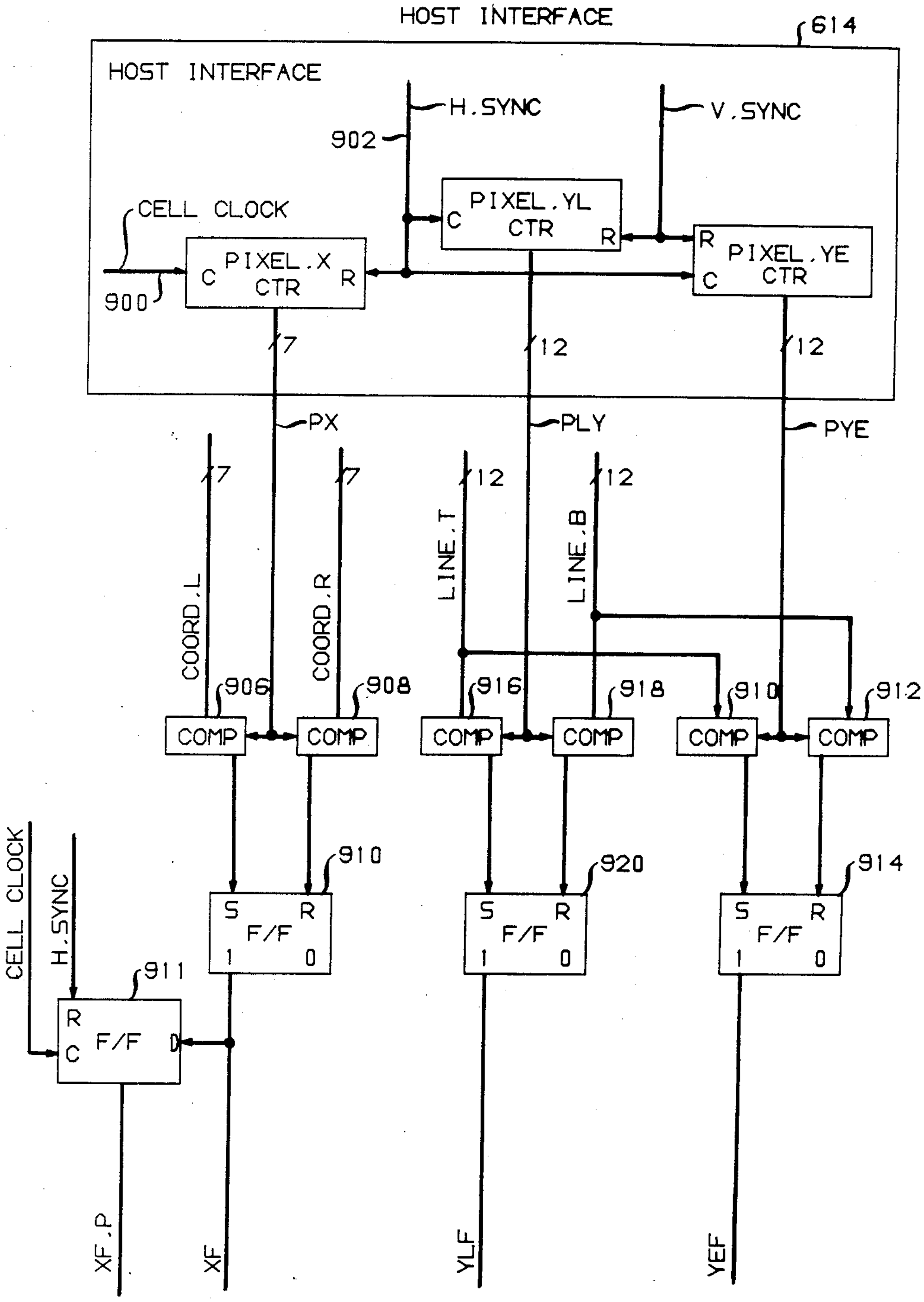
FIG. 9 illustrates a per window circuit for detecting when the associated window is being refreshed on the display device and related circuitry in a common interface circuit to a host precursor.

An "in window" detector is shown in FIG. 9 along with part of the host interface 614. The host interface contains three counters PIXEL.X, PIXEL.YL and PIXEL.YE. PIXEL.X keeps track of the present horizontal cell position presently being displayed on the screen. It is recalled that a cell is illustratively sixteen pixels wide in the preferred embodiment. Thus, the cell clock at 900, which is being counted by PIXEL.X is really the pixel clock divided by sixteen. As the scanning of each screen line is completed, a horizontal sync signal H.SYNC at 902 from the display 506 resets PIXEL.X. The signals on H.SYNC are also counted by screen line counters PIXEL.YL and PIXEL.YE. Both of these counters are reset by a vertical sync signal V.SYNC on lead 904 from the display 506 each time a full screen is completed. PIXEL.YE resets to zero. PIXEL.YL, however, is arranged to reset to a negative four. The reason for having two line counters and the reset value distinction has to do with window border generation, as will be seen.

The cell count is outputted on bus PX to two comparators 906 and 908. Respective secondary inputs to these comparators come from the registers COORD.L and COORD.R in the descriptor registers circuit in FIG. 8. When the screen raster is at the position corresponding to COORD.L, that is entering the window on the left (see FIG. 1), comparator 906 sets a flip-flop 910. This flip-flop is reset by comparator 908 as the window is exited on the right. Thus, flip-flop 910 produces a signal on its output lead XF whenever the screen raster is within the horizontal bounds of the window. This signal is delayed by one cell time by delay flip-flop 911 to generate a delayed signal on output lead XF.P. This signal is used by border detector 610 to define the raster time corresponding to a vertical left or right window border and is discussed with respect to FIG. 12. Flip-flop 911 is reset at the beginning of each raster line by H.SYNC to prevent any carryover effect from the immediately preceding line.

In a similar fashion as above, comparators 910, 912 and flip-flop 914 generate a signal on output lead YEF whenever the screen raster is within the vertical bounds of the window. A signal on lead YLF is an image of that of YEF, but precedes YEF by four raster lines due to the reset states of PIXEL.YL and PIXEL.YE and to the action of comparators 916, 918 and flip-flop 920.

Figure 15:
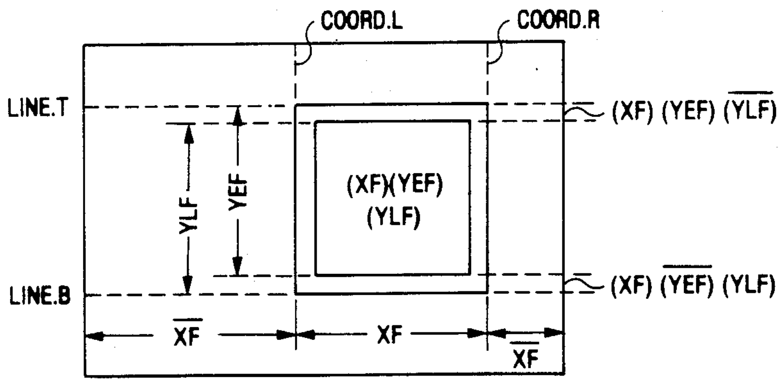
FIG. 15 defines window area and borders in the illustrative embodiment in terms of boolean expressions of signals generated by the disclosed circuitry.

The physical meaning of the above window signals can be seen easily in FIG. 15 which depicts a screen with a single window including a border. In the horizontal scanning direction, XF becomes true when the raster is between COORD.L and COORD.R. Note that for a window with a border, the border is inside these coordinate points. In the vertical direction, YEF is true from LINE.T (including the upper horizontal border, if any) to the bottom line of the inside of the window (i.e., not including the lower horizontal border). Conversely, YLF is true between the upper window line, not including the upper horizontal border, to the bottom line, including the bottom border. Thus, the inside of a bordered window is defined by the boolean expression (XF) (YEF) (YLF). The upper border, if any, is being scanned when the boolean expression (XF) (YEF) ($\overline{\text{YLF}}$) is true. The bottom border, if any, is being scanned when the boolean expression (XF) ($\overline{\text{YEF}}$) (YLF) is true. The vertical left and right borders are not defined by boolean expressions, but are handled by one-quarter cell timing delays when signal XF transitions from true to false and from false to true, as will be seen.

Figure 10:
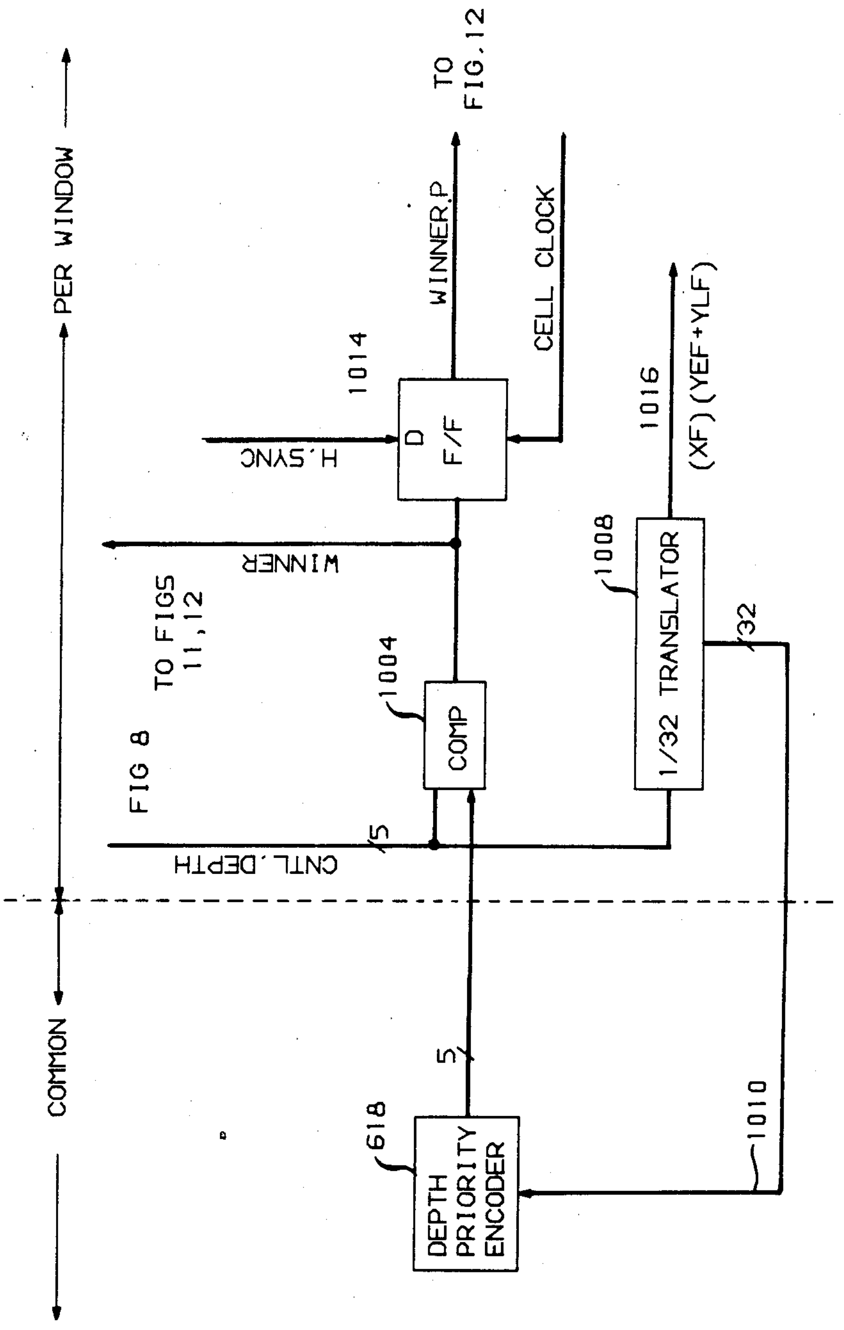
FIG. 10 illustrates common and per window circuitry for determining which, if any, window is being refreshed on the display device.

A window winner circuit 612 is shown on the right side of FIG. 10. The left side, separated by a vertical dotted line, is the depth priority encoder 618 in the common section of the window manager. A five lead bus 1000 extends to each of the individual window circuits. A multiple on bus 1000 to each of the other per window sections is shown at 1002. On the right side of FIG. 10, an indication of the depth of a window is brought into a comparator 1004 on bus 1006 from the descriptor registers circuit in FIG. 8. This depth indication is also received and decoded into a 1-out-of-32 signal by translator 1008, if translator 1008 is enabled, and a resulting signal is placed onto an appropriate lead of bus 1010 extending back to the depth priority encoder 618. Translator 1008 is enabled by a signal on lead 1016 generated from "in window" detector signals in FIG. 9 which, as indicated by the boolean equation (XF) (YEE+YLF), occurs whenever the display raster is inside a window.

Bus 1010 is also multiplied to the other per window circuits as indicated at multiple 1012. Encoder 618 determines the highest priority signal present on bus 1010 at any time and returns an indication of this on bus 1002 in the same format as the depth indications received from the descriptor registers circuit. Comparator 1004 in each per window circuit compares the highest priority indication from encoder 618 to its window depth and generates a signal on lead WINNER if a match is detected. This signal is also delayed by one cell time by flip-flop 1014 to produce a signal WINNER.P. WINNER.P is also used by the border generator shown in FIG. 12.

There is always a winning window in the preferred embodiment. Host processor 502 defines a default window if a user fails to do so.

Figure 11:
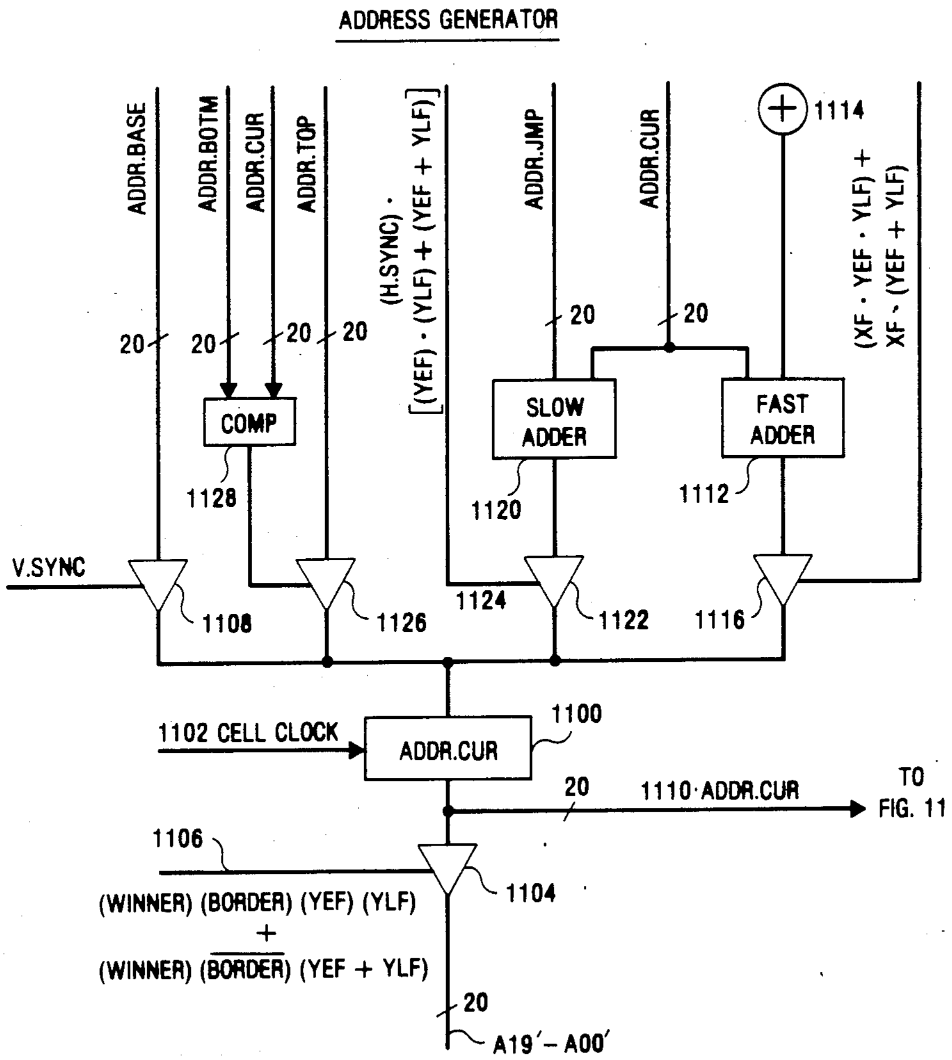
FIG. 11 shows an illustrative per window bitmap address generator.
Figure 12:
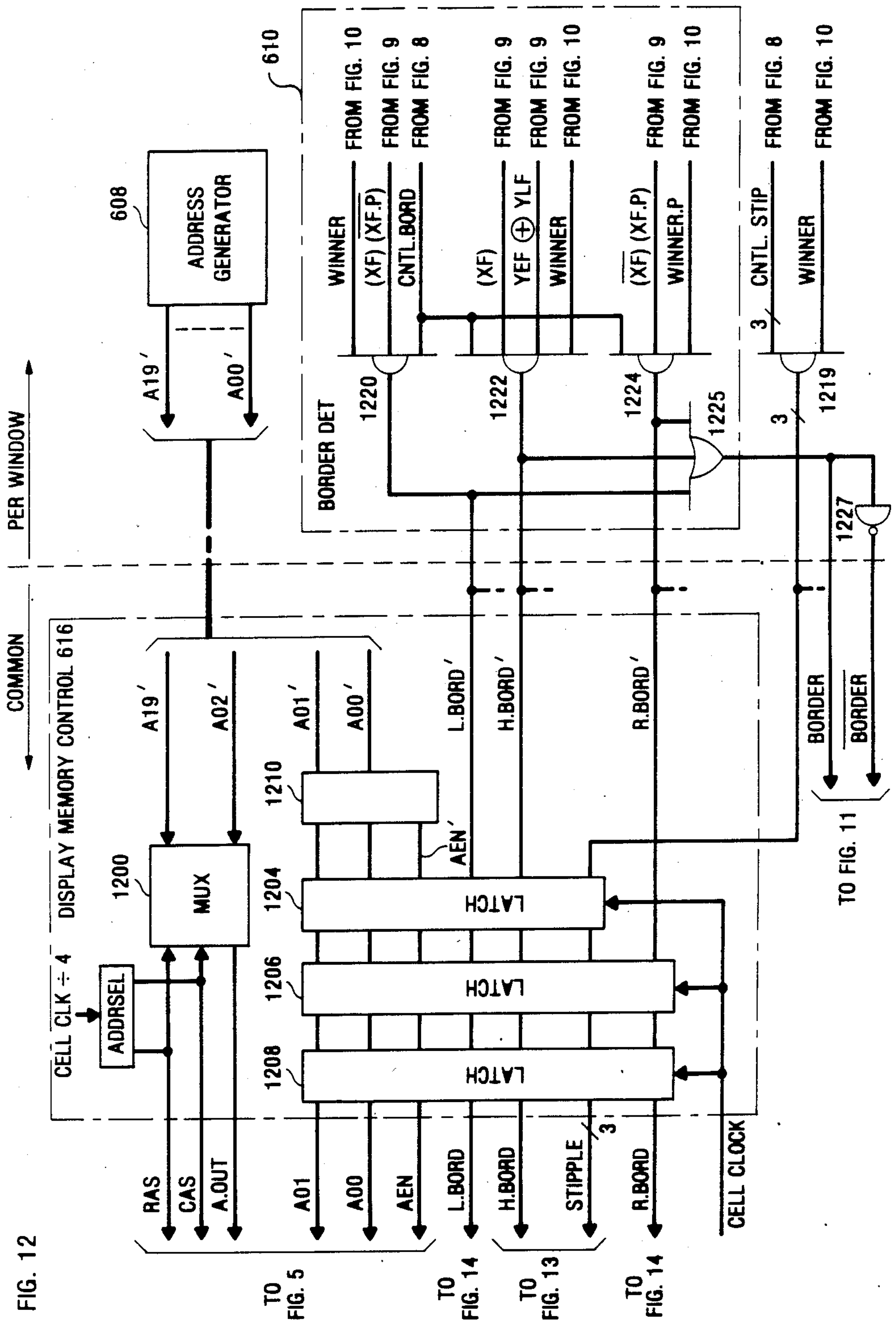
FIG. 12 shows an illustrative output control circuit as part of the common circuitry and a window border detector that identifies when a window border is being refreshed on the display device.

Address generator 608, shown in FIG. 11, in each per window circuit uses the "in window" signals from FIG. 9 and the WINNER signal from FIG. 10 to generate bitmap addresses. Present bitmap address is maintained in a register ADDR.CUR 1100. The cell clock signal appearing on lead 1102 loads an address into register 1100 from one of the sources in the upper part of FIG. 11 at the beginning of each cell time. An output driver 1104 gates the address in register 1100 to the bitmap address leads A19′ through A00′ at the proper times and thence to the common portion of the window manager. Enable signals appearing on lead 1106 to driver 1104 determine when addresses are gated to these address leads. The upper boolean enabling term (WINNER) (BORDER) (YEF) (YLF), shown on lead 1106 in FIG. 11, activates driver 1104 when this window is determined to be the highest depth and a border is present. Circuitry for generating the BORDER signal is shown in FIG. 12. (YEF) (YLF) insures that the screen area being scanned is inside the border area. The signal WINNER is true only when XF is present. This insures that the horizontal line portion being scanned is also within the window. The bottom enabling term on lead 1106, (WINNER) ($\overline{\text{BORDER}}$) (YEF+YLF), enables address outputting for the entire window, including the normal border areas, when no border is present.

At the beginning of a screen scan, the vertical sync signal V.SYNC enables a driver 1108, which gates the base address of this window into register 1100. This prepares the starting bitmap memory address when the raster first enters the window. In addition to being gated to the address bus at appropriate times, the contents of ADDR.CUR are returned on lead 1110 to one input of a fast adding circuit 1112 at the upper right corner of FIG. 11. A second input of adder 1112 is attached to a positive voltage at 1114. This causes adder 1112 to increment the address from ADDR.CUR by one. This incremented address is returned and loaded into register 1100 at the beginning of each cell time while driver 1116 is enabled. The signals appearing on enabling lead 1118 follow the boolean expression (XF) (YEF) (YLF)+(XF) (YEF+YLF), which is true when the screen raster is inside the border and/or window area. It may be helpful to now refer to FIG. 14 which identifies the various parts of a window with appropriate boolean expressions. This arrangement increments ADDR.CUR 1100 each cell time to move sequentially through the bitmap until the raster leaves the right side edge of the window on the present screen line. When the raster moves out of the window on the right side of the screen, a jump in the bitmap address is made to the proper address associated with the left side of the window in the next screen line. A slow adder is used for this purpose, since time is available for address update until the raster actually arrives at the next window left edge. Slow adder 1120 adds the contents of register ADDR.JMP (see FIGS. 3 and 4) to the current address. At the beginning of the next screen line, assuming that this line is still within the window, driver 1122 is enabled by the signal on lead 1124, (H.SYNC)((YEF)(YLF)+(YEF+YLF)), and gates the new address into ADDR.CUR.

Similarly, driver 1126 gates the beginning bitmap address into ADDR.CUR when it becomes necessary to loop from the bottom of the bitmap (ADDR.BOTM in FIGS. 3 and 4) to the beginning of the bitmap (ADDR.TOP). To accomplish this, comparator 1128 compares the contents of register ADDR. BOT in the descriptor registers circuit with ADDR.CUR and enables driver 1126 when a match occurs.

FIG. 12 shows the display memory control 616 in the common circuitry and per window circuitry that cooperate to control the generation of window borders. The interface between the bitmap address generator 608 and the common circuitry is also shown. The common and per window sections are shown on the left and right of FIG. 12, respectively. First, the bitmap addressing is described. Assuming that the per window circuit shown on the right of FIG. 12 is that of the winner at any given time, an appropriate address appears on the leads A19′ to A00′ as before described. Leads A19′ through A02′ appear at the input of a multiplexing circuit 1200 in display memory control 616. Two other inputs to multiplexer 1200 are the display memory row and column signals on leads RAS and CAS. These signals are generated by an address select circuit 1202. The purpose of multiplexer 1200 and address select 1202 is to partition the address on leads A19′ through A02′ into two parts and to multiplex the two parts onto a nine lead address bus A.OUT. As shown in FIG. 5, A.OUT extends to the display memory 504. Address select 1202 merely toggles signals on RAS and CAS at proper times based on the word clock to accomplish this purpose.

Border detector 610, shown on the right of FIG. 12, generates signals whenever the raster coincides with a border area of a winning window. These signals cause the automatic generation of raster border signals which are modulated into the display signal stream instead of signals from display memory 504. Specifically, gates 1220, 1222 and 1224 are enabled by a signal CNTL.BORD from the descriptor register circuit in FIG. 8 if this particular window circuit has a border defined. Whenever this window circuit is the highest depth priority (WINNER true) and the raster is within the left vertical border area as defined by the boolean equation (LF)(LF.P), gate 1220 activates lead L.BORD′. Similarly, gates 1222 and 1224 activates leads H.BORD′ and R.BORD′, respectively, when horizontal and right vertical border areas are detected for this winning circuit. L.BORD′, R.BORD′, and H.BORD′ are combined by an OR gate 1225 to generate the above-mentioned signal BORDER. NAND gate 1227 complements BORDER to form $\overline{\text{BORDER}}$. According to the inputs to gates 1224, the R.BORD signal is generated as the window is exited on the right. To now generate the right vertical border on the screen just before the window is exited requires that the actual screen signals be generated after detecting such a window exit. This is accomplished by latch circuits described immediately below.

L.BORD′ and H.BORD′ are inputted to the first of three cascaded latch stages 1204, 1206 and 1208 in the display memory control. R.BORD′, however, is inputted to the second latch stage 1206. Similarly, the least significant address leads A01′ and A00′ from address generator 608 are inputted to the first latch stage 1204 via a circuit 1210. Circuit 1210 decodes the A00′ and A01′ signals to generate the address enable signal AEN, which is also inputted to the first delay stage 1204. The corresponding output signals from the third stage 1208, A00, A01, AEN, L.BORD, H.BORD and R.BORD are the signals actually used for controlling the screen image. A given cell clock signal at latch 1204 gates in the states of its inputs. Two cell clock signals later, these states appear at the output of latch 1208. The one cell difference in delay between R.BORD and L.BORD created by latches 1206 and 1204 is used by the output current 522 to create right edge window borders, as will be seen.

An AND gate 1219 in the pel window circuitry is enabled when the associated window is the winning window. This causes stipple pattern select signals from the descriptor registers to also be gated to the input of first latch 1204. The corresponding delayed output signals appear at the output STIPPLE of latch 1208 in synchronizing with the above-described signals for controlling the actual display of data.

Figure 13:
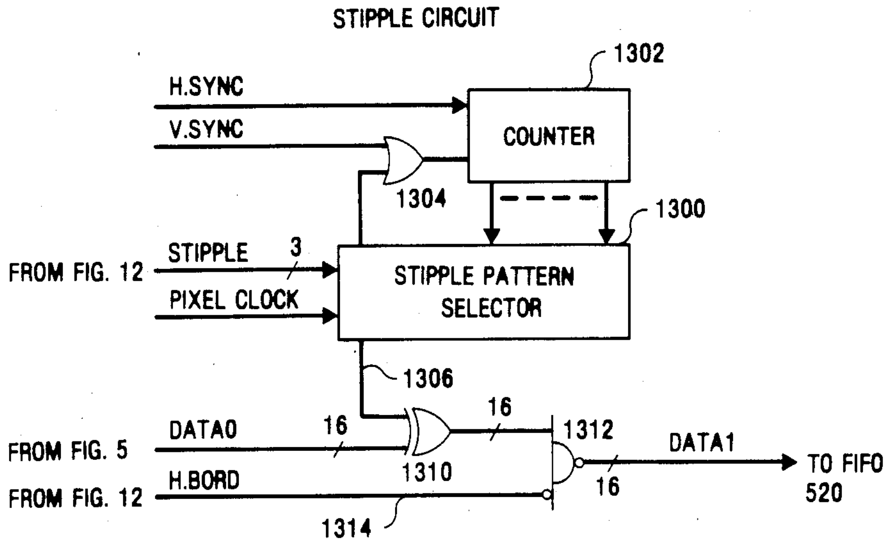
FIG. 13 illustrates an exemplary circuit for generating window background (stipple) patterns.

Horizontal border generation on the screen, as well as background window stipple patterns are generated by the stipple circuit 514. The details of circuit 514 are shown in FIG. 13.

A stipple pattern selected circuit 1300 receives the STIPPLE signals to select the pattern for the associated window. A counter 1302 is used to keep track of the pixel spacing between the stipples (e.g., data). Counter 1302 is reset at the beginning of a screen by V.SYNC whihc is applied to the counter 1300 reads the H.SYNC increments counter 1302. Selector 1300 reads the counter outputs to detect when a stipple should be inserted into the display data stream (or determined by the selected stipple pattern). When this occurs, selector 1300 applies a data signal to lead 1306 and a signal to lead 1308 to reset counter 1302. The signal on lead 1306 is injected into the display data stream on DATAO by an EXCLUSIVE OR gate 1310. The output of gate 1310 extends to a NAND gate 1310. The output of gate 1310 extends to a NAND gate 1312 which outputs the stream to bus DATA1. Bus DATA1 extends to FIFO 520 where the data signals are temporarily stored. Signals for creating a horizontal border on the display device are injected at gate 1312 whenever a H.PORD signal appears on lead 1314.

Figure 14:
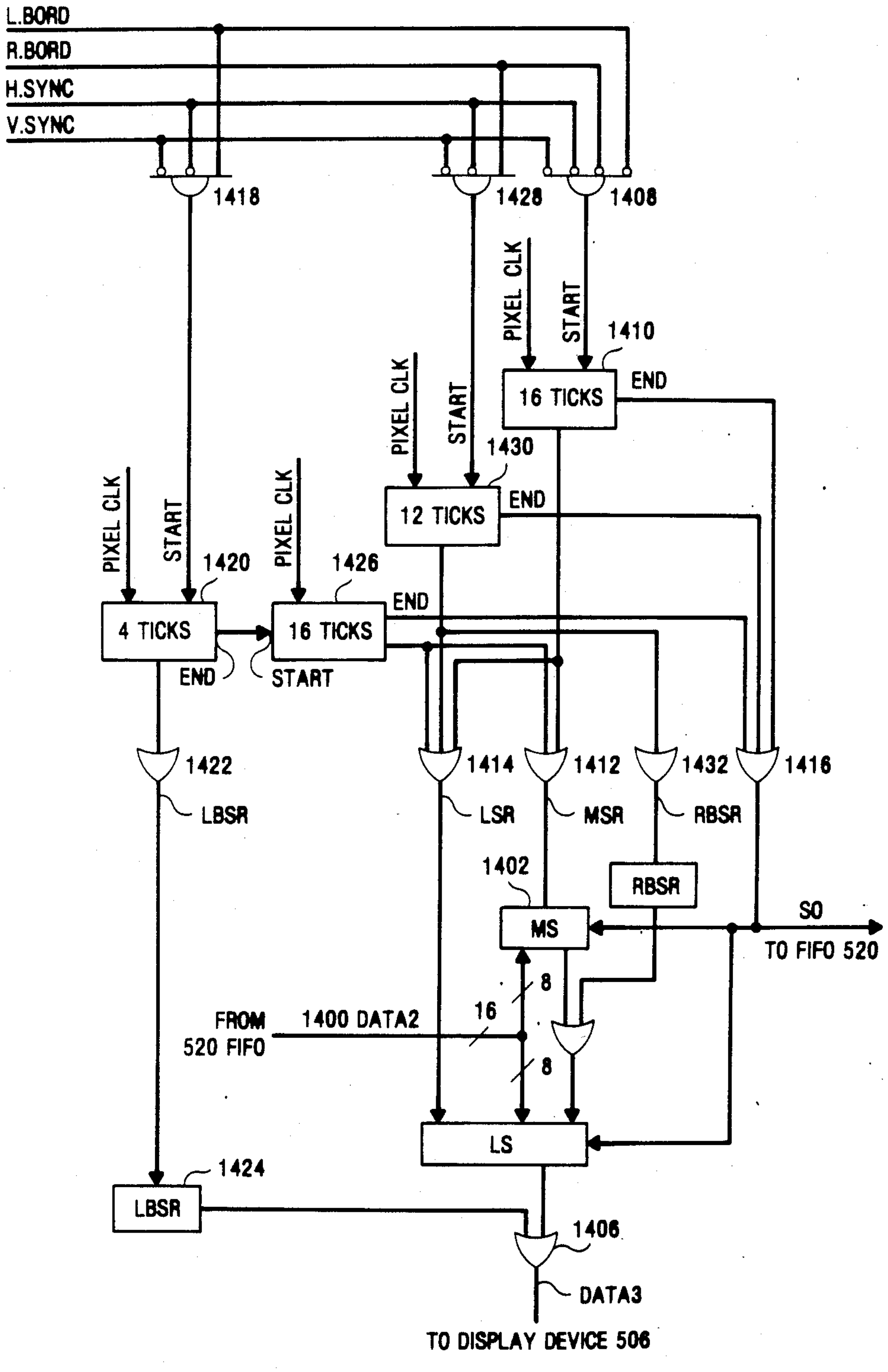
FIG. 14 illustrates an exemplary output shift register circuit that generates vertical window border data and transmits this data and etched display data to the display device.

The output control 522 in FIG. 14 performs the final operations to generate the vertical window borders. Cell data from FIFO 520 appears on incoming bus 1400 in sixteen bit parallel format. The eight most significant of these bits is inputted to a shift register 1402 and the eight least significant bits is put into another shift register 1404, both under control of a shift-out signal SO, described below. When no border considerations are present, signals on leads LSR and MSR cause the data to be shifted out serially from SR 1404 to the display device 506 via OR gate 1406 and simultaneously from SR 1402 to SR 1404.

Signals on leads LSR and MSR are generated as follows. Gate 1408 is activated when neither L.BORD or R.BORD is present. An output signal of gate 1408 activates a tick circuit 1410. Circuit 1410, in turn, then outputs a stream of sixteen pulses to OR gates 1412 and 1414 in synchronism with pixel clock pulses to shift out one cell of data from SRs 1402 and 1404. At the end of the sixteen pulse stream, tick circuit applies a signal to OR gate 1416 to generate the SO signal. This signal is returned to FIFO 520 to gate out another cell of data. Simultaneously, it gates that data into SRs 1402 and 1404. When a left-edge border is detected L.BORD activates gate 1418, which, in turn, activates tick circuit 1420. Four pulses are applied to OR gate 1422 as a result. The resulting four signals on lead LBSR shift out four fixed signals from a SR 1424 to inject a four pixel wide portion of a vertical border. At the end of this interval, tick circuit 1420 activates tick circuit 1426, which pulses gates 1412 and 1414 to shift out another cell of data from SRs 1402 and 1404. When this is accomplished, circuit 1426 pulses OR gate 1416 to generate SO. Gate 1428 is activated when a right-edge border is detected. In response, tick circuit 1430 generates 12 tick pulses. The first eight of these cause eight data bits to be outputted from the least significant SR 1404. Simultaneously, twelve border signals are shifted into SR 1404 by the tick signals applied to OR gate 1432. The first four of these border signals will eventually be outputted from SR 1404 to the data stream. The remaining will be replaced by new cell data from FIFO 520, as described.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. A bitmapped graphics workstation comprising a host processor, a visual output display device having a raster scanned display screen, and means for defining a plurality of independent window areas on the screen and for controlling the display of data in each of the windows, said means for defining and controlling further comprising a plurality of bitmap storage areas each having contiguous storage words addressable by the host processor for storing display data associated with a different said window, means for storing definitions of window boundaries on the screen, means responsive to the window definition storing means for determining when the screen raster is refreshing an area of the screen associated with a defined window, means responsive to the determining means for identifying a highest priority window at the location of the raster, means activated by the identifying means for retrieving display data from one of the bitmap storage areas associated with the highest priority window at a generated address thereof corresponding to the screen position of the raster, means for reading the data at the generated address, and means for transmitting the retrieved display data to the display device in synchronism with the raster.

2. The invention of claim 1 in which the identifying means further comprises means for storing an individual depth indication for each defined window identifying a conceptual layer on the screen for the window, means for identifying from the stored depth indications a winning window, if any, having the highest depth priority at every display entity on the screen, and means responsive to the winner identifying means for retrieving display data for the screen display entity from the bitmap associated with the winning window.

3. The invention of claim 2 further comprising first access means for allowing the host processor to write display data into the bitmaps.

4. The invention of claim 3 further comprising
second access means for allowing the host processor to write window defining data into the window boundary storing means.

5. The invention of claim 4 further comprising
means for modulating into the display data sent to the display device signals for creating a background stipple pattern for the windows.

6. The invention of claim 5 further comprising
means for specifying individual stipple patterns for each window.

7. The invention of claim 6 wherein the stipple specifying means further comprises
means for storing individual stipple pattern indications for each window.

8. The invention of claim 7 further comprising
third access means for allowing the host processor to write data into the stipple pattern storing means.

9. The invention of claim 1 wherein the window boundary storing means further comprise
means for storing data representing screen coordinate positions which define the position of the associated window on the screen, and
the highest priority window identifying means further comprises
first counter means for identifying the horizontal position of the raster on the screen,
second counter means for identifying the vertical position of the raster on the screen,
means for comparing the window coordinate data with the contents of the first and second counters, and
means responsive to the comparing means for generating in window signals.

10. The invention of claim 9 wherein a said bitmap address identifies a bitmap word of display data of a prescribed width and wherein the first counter means identifies a horizontal position on a scan line of the display device that is an integer subdivision of the prescribed width of a said word.

11. The invention of claim 1 wherein the bitmap address generating means further comprises
first means for storing an address of a bitmap word associated with the beginning of the associated window on the screen when scanned from top-to-bottom and left-to-right,
second means for storing a bitmap address offset value representing the bitmap address distance between the right vertical edge of the associated window in one scan line on the screen and the beginning of the left vertical edge of the window in the next consecutive scan line of the screen,
third means for storing a bitmap address corresponding to the last word in the bitmap containing data associated with the window,
fourth means for storing a bitmap address identifying the first word in the bitmap associated with the window,
fifth means for storing a present bitmap address,
means for incrementing the contents of the fifth storing means in synchronism with movement of the raster,
means for gating the contents of the first storing means into the fifth storing means when the window is initially entered on each screen refresh,
means for adding the contents of the second storing means to the contents of the fifth storing means when the window is exited at the right vertical edge, and
means for gating the contents of the fourth storing means into the fifth storing means when the present bitmap address equals the contents of the third storing means.

12. A bitmapped graphics workstation comprising
a host processor,
a visual output display device having a raster scanned display screen, and
means for defining a plurality of independent display windows on the screen and for controlling the display of data in each of the windows, said means for defining and controlling further comprising
a common circuit connected to a plurality of individual window circuits,
the common circuit including a plurality of bitmaps individually associated with the window circuits,
and the window circuits each including
means for storing prescribed types of data defining a window
means responsive to the window defining data and to screen synchronization signals for detecting when the screen raster is in a window on the screen, and
means responsive to the window defining data to the "in window" detecting means and to the synchronization signals for generating addresses in the bitmap associated with the window and corresponding to the position of the screen raster,
and wherein the common circuit further comprises
means for retrieving screen display data from the bitmaps responsive to the addresses from the individual window circuits, and
means for transmitting the retrieved data serially to the display device in synchronization with the screen raster.

13. The invention of claim 12 in which each window circuit further comprises
means for storing an individual depth indication identifying a conceptual layer on the screen for its associated window, and
means in the "in window" detecting means for transmitting the depth indication to the common circuit when the screen raster is inside the screen window,
wherein the common circuit further comprises
means for identifying from the depth indications received from the window circuits a winning window, if any, having the highest depth priority at every display entity on the screen, and
means for transmitting an indication of the winning window to the window circuits.

14. The invention of claim 13 wherein the "in window" detecting means further comprises
means for determining from the winning window indication whether or not this window circuit is associated with the winning window.

15. The invention of claim 14 in which the bitmap address generating means further comprises
means responsive to a signal from the determining means for activating the bitmap address generation means.

16. The invention of claim 15 further comprising
first access means for allowing the host processor to write display data into the bitmaps.

17. The invention of claim 16 further comprising
second access means for allowing the host processor to write window defining data into the window defining storing means.

18. The invention of claim 17 further comprising means for modulating into the display data sent to the display device signals for creating a background stipple pattern for the windows.

19. The invention of claim 18 further comprising means for specifying individual stipple patterns for each window.

20. The invention of claim 19 wherein the stipple specifying means further comprises means for storing individual stipple pattern indications for each window.

21. The invention of claim 20 further comprising third access means for allowing the host processor to write data into the stipple pattern storing means.

22. The invention of claim 12 wherein the means for "in window" detection further comprise means for storing data representing screen coordinate positions which define the position of the associated window on the screen, first counter means for identifying the horizontal position of the raster on the screen, second counter means for identifying the vertical position of the raster on the screen, means for comparing the window coordinate data with the contents of the first and second counters, and means responsive to the comparing means for generating "in window" signals.

23. The invention of claim 12 wherein the bitmap address generating means further comprises first means for storing an address of a bitmap word associated with the beginning of the associated window on the screen when scanned from top-to-bottom and left-to-right, second means for storing a bitmap address offset value representing the bitmap address distance between the right vertical edge of the associated window in one scan line on the screen and the beginning of the left vertical edge of the window in the next consecutive scan line of the screen, third means for storing a bitmap address corresponding to the last word in the bitmap containing data associated with the window, fourth means for storing a bitmap address identifying the first word in the bitmap associated with the window, fifth means for storing a present bitmap address, means for incrementing the contents of the fifth storing means in synchronism with movement of the raster, means for gating the contents of the first storing means into the fifth storing means when the window is initially entered on each screen refresh, means for adding the contents of the second storing means to the contents of the fifth storing means when the window is exited at the right vertical edge, and means for gating the contents of the fourth storing means into the fifth storing means when the present bitmap address equals the contents of the third storing means.

24. An integrated semiconductor circuit for interfacing with a host processor, and a visual output display device having a raster scanned display screen, said circuit comprising means for defining a plurality of independent window areas on the screen and for controlling the display of data in each of the windows, said means for defining and controlling further comprising a plurality of bitmap storage areas each having contiguous storage words addressable by the host processor for storing display data associated with a different said window, means for storing definitions of window boundaries on the screen, means responsive to the window defining means for identifying when the screen raster is refreshing an area of the screen associated with a defined window, means activated by the identifying means for retrieving display data from one of the bitmap storage areas associated with the window at locations thereof corresponding to the screen position of the raster, and means for transmitting the retrieved display data to the display device in synchronism with the raster.

25. The invention of claim 24 in which the defining and controlling means further comprises means for storing an individual depth indication for each defined window identifying a conceptual layer on the screen for the window, means for identifying from the stored depth indications a winning window, if any, having the highest depth priority at every display entity on the screen, and means responsive to the winner identifying means for retrieving display data for the screen display entity from the bitmap associated with the winning window.

26. The invention of claim 25 in which the means for retrieving display data from the bitmaps further comprises means responsive to the window defining means for generating an address in the winning window bitmap associated with the screen display entity.

27. The invention of claim 26 further comprising first access means for allowing the host processor to write display data into the bitmaps.

28. The invention of claim 27 further comprising second access means for allowing the host processor to write window defining data into the window boundary storing means.

29. The invention of claim 28 further comprising means for modulating into the display data sent to the display device signals for creating a background stipple pattern for the windows.

30. The invention of claim 29 further comprising means for specifying individual stipple patterns for each window.

31. The invention of claim 30 wherein the stipple specifying means further comprises means for storing individual stipple pattern indications for each window.

32. The invention of claim 31 further comprising third access means for allowing the host processor to write data into the stipple pattern storing means.

33. The invention of claim 24 wherein the means for "in window" detection further comprise means for storing data representing screen coordinate positions which define the position of the associated window on the screen, first counter means for identifying the horizontal position of the raster on the screen, second counter means for identifying the vertical position of the raster on the screen, means for comparing the window coordinate data with the contents of the first and second counters, and means responsive to the comparing means for generating "in window" signals.

34. The invention of claim 24 wherein the bitmap address generating means further comprises first means for storing an address of a bitmap word associated with the beginning of the associated window on the screen when scanned from top-to-bottom and left-to-right, second means for storing a bitmap address offset value representing the bitmap address distance between the right vertical edge of the associated window in one scan line on the screen and the beginning of the left vertical edge of the window in the next consecutive scan line of the screen, third means for storing a bitmap address corresponding to the last word in the bitmap containing data associated with the window, fourth means for storing a bitmap address identifying the first word in the bitmap associated with the window, fifth means for storing a present bitmap address, means for incrementing the contents of the fifth storing means in synchronism with movement of the rester.

means for gating the contents of the first storing means into the fifth storing means when the window is initially entered on each screen refresh, means for adding the contents of the second storing means to the contents of the fifth storing means when the window is exited at the right vertical edge, and means for gating the contents of the fourth storing means into the fifth stroing means when the present bitmap address equals the contents of the third storing means.

35. An integrated semiconductor circuit for interiacing with a host processor, and a visual output display device having a raster scanned display screen, said circuit comprising means for defining a plurality of independent display windows on the screen and for controlling the display of data in each of the windows, said means for defining and controlling further comprising a common circuit connected to a plurality of individual window circuits, the common circuit including a plurality of bitmaps individually associated with the window circuits, and the window circuits each including means for storing prescribed types of data defining a window means responsive to the window defining data and to screen synchronization signals for detecting when the screen raster is in an associated window on the screen, and means responsive to the window defining data, to the "in window" detecting means and to the synchronization signals for generating addresses in the bitmap corresponding to the position of the screen raster.

36. The invention of claim 35 in which each window circuit further comprises means for storing an individual depth indication identifying a conceptual layer on the screen for its associated window, and means in the "in window" detecting means for transmitting the depth indication to the common circuit when the screen raster is inside the screen window, wherein the common circuit further comprises means for identifying from the depth indications received from the window circuits a winning window, if any, having the highest depth priority at every display entity on the screen, and means for transmitting an indication of the winning window to the window circuits.

37. The invention of claim 36 wherein the "in window" detecting means further comprises means for determining from the winning window indication whether or not this window circuit is associated with the winning window.

38. The invention of claim 37 in which the bitmap address generating means further comprises means responsive to a signal from the determining means for activating the bitmap address generation means.

39. The invention of claim 38 further comprising first access means for allowing the host processor to write display data into the bitmaps.

40. The invention of claim 39 further comprising second access means for allowing the host processor to write window defining data into the window defining storing means.

41. The invention of claim 40 further comprising means for modulating into the display data sent to the display device signals for creating a background stipple pattern for the windows.

42. The invention of claim 41 further comprising means for specifying individual stipple patterns for each window.

43. The invention of claim 42 wherein the stipple specifying means further comprises means for storing individual stipple pattern indications for each window.

44. The invention of claim 43 further comprising third access means for allowing the host processor to write data into the stipple pattern storing means.

45. The invention of claim 35 wherein the means for "in window" detection further comprise means for storing data representing screen coordinate positions which define the position of the associated window on the screen, first counter means for identifying the horizontal position of the raster on the screen, second counter means for identifying the vertical position of the raster on the screen, means for comparing the window coordinate data with the contents of the first and second counters, and means responsive to the comparing means for generating "in window" signals.

46. The invention of claim 35 wherein the bitmap address generating means further comprises first means for storing an address of a bitmap word associated with the beginning of the associated window on the screen when scanned from top-to-bottom and left-to-right.

second means for storing a bitmap address offset value representing the bitmap address distance between the right vertical edge of the associated window in one scan line on the screen and the beginning of the left vertical edge of the window in the next consecutive scan line of the screen, third means for storing a bitmap address corresponding to the last word in the bitmap containing data associated with the window, fourth means for storing a bitmap address identifying the first word in the bitmap associated with the window, fifth means for storing a present bitmap address, means for incrementing the contents of the fifth storing means in synchronism with movement of the raster, means for gating the contents of the first storing means into the fifth storing means when the window is initially entered on each screen refresh, means for adding the contents of the second storing means to the contents of the fifth storing means when the window is exited at the right vertical edge, and means for gating the contents of the fourth storing means into the fifth storing means when the present bitmap address equals the contents of the third storing means.

* * * * *